United States Patent [19]

Ishida et al.

[11] 3,905,657

[45] Sept. 16, 1975

[54] LUBRICATED VERTICAL THRUST BEARING

[75] Inventors: Isao Ishida, Takahagi; Yutaka Kitano, Hitachi, both of Japan

[73] Assignee: Hitachi, Ltd., Hitachi, Japan

[22] Filed: Oct. 30, 1973

[21] Appl. No.: 411,178

[30] Foreign Application Priority Data
Nov. 10, 1972 Japan.............................. 47-112114

[52] U.S. Cl. .................... 308/73; 308/77; 308/122; 308/160; 308/170
[51] Int. Cl.² ..................... F16C 1/24; F16C 17/06; F16C 33/66; F16C 37/00
[58] Field of Search ...... 308/73, 76, 77, 122, 134.1, 308/160, 170

[56] References Cited
UNITED STATES PATENTS 2,906,570  9/1959  Nenicka et al........................ 308/76
3,160,450  12/1964  Gentiluomo ........................ 308/160

Primary Examiner—M. Henson Wood, Jr.
Assistant Examiner—Howard Beltran
Attorney, Agent, or Firm—Craig & Antonelli

[57] ABSTRACT

A thrust bearing device for use in a vertical shaft rotary machine, in which an oil overflowing chamber is so provided around a sector-shaped bearing pad as to extend along the radially inner and outer sides of said pad and the side thereof facing the direction of rotation of a bearing runner in a manner that said chamber is open to the sliding surface of pad relative to said bearing runner, and in which lubrication oil is fed to said oil overflowing chamber so as to permit overflow therefrom in a manner that the minimum amount of lubricating oil may be fed to the sliding surface of said bearing pad relative to the bearing runner.

5 Claims, 9 Drawing Figures ered in the art. This means that a bearing pad is, in general, of a sector shape, thus leading to the presence of plates 6A, 6B and 7, and hence these are naturally of sector shape.

LUBRICATED VERTICAL THRUST BEARING

BACKGROUND OF THE INVENTION

A thrust bearing device, in general, has a bearing runner rigid with a rotational shaft, with said runner being slidably supported on a plurality of bearing pads, and the bearing runner and the bearing pads are housed within an oil tub filled with lubricating oil. With such an arrangement, the whole weight of rotating portions of, for example, a water turbine generator is slidably carried on said pads.

The bearing loss, with which a thrust bearing device of the type is encountered is classified into a friction loss which is produced on the sliding surface of a bearing runner relative to a bearing pad and an agitation loss resulting from the rotation of the bearing runner within lubricating oil. The agitation loss of lubricating oil increases with increase in the peripheral speed of a bearing runner. Hitherto, it has been almost impossible to control the increase in agitation loss, because of the bearing runner being arranged so as to contact with lubricating oil, over a considerable portion thereof including the sliding surface of a bearing runner relative to a bearing pad. To reduce agitation loss, it appears useful to lower a level of lubricating oil down to that near to the sliding surface. The lowered level of oil, however, results in the occurance of a whirl in oil surface, as shown by the dotted line in FIG. 1, due to the agitation by the bearing runner rotating in the oil, thereby bringing said sliding surface above the lubricating oil surface, with the resultant binding on the sliding surface due to the absence of the lubricating oil. Accordingly, it is not recommendable to simply lower the level of lubricating oil without applying proper measures there.

SUMMARY OF THE INVENTION

The present invention is directed to reducing agitation loss of lubricating oil, to the possibly greatest extent, aside from the aforesaid bearing loss. To this end, the lubricating oil is fed only to a sliding surface of the bearing runner relative to the bearing pad, with the other surfaces of the bearing runner being maintained out of contact with the lubricating oil, whereby the loss of lubricating oil due to agitation by the bearing runner is reduced to a great extent, thereby enhancing the efficiency of a rotary machine.

According to the present invention, an oil overflowing chamber is so provided around a sector-shaped bearing pad as to extend along the radially inner and outer sides of said pad and the side thereof facing the direction of rotation of a bearing runner in a manner that said chamber is open to the sliding surface of pad relative to said bearing runner and in which lubricating oil is fed to said oil overflowing chamber so as to permit overflow therefrom in a manner that the minimum amount of lubricating oil may be fed to the sliding surface of said bearing pad relative to the bearing runner.

BRIEF DESCRIPTION OF THE DRAWINGS

FIGS. 1 and 2 are longitudinal cross-sectional views of a thrust bearing device, wherein FIG. 1 shows a conventional device and FIG. 2 shows the device according to the present invention;

DETAILED DESCRIPTION OF THE INVENTION

Figure 1:
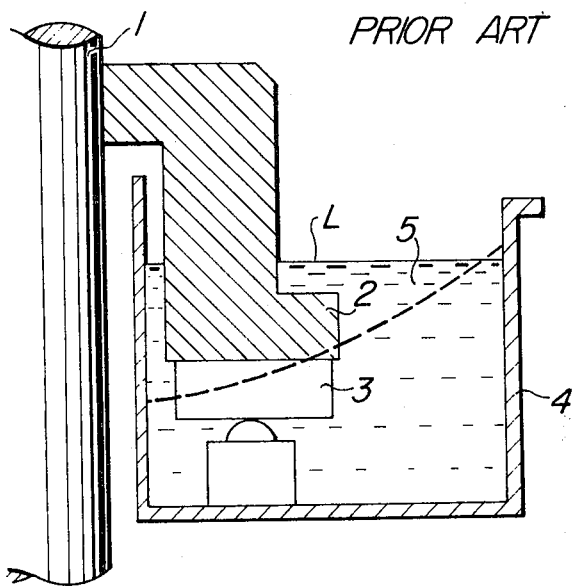

FIG. 1 is a conventional type thrust bearing device, in which a bearing runner 2 rigid with a rotational shaft 1 is slidably supported on a plurality of sector shaped bearing pads 3, and said bearing runner 2 and said plurality of sector shaped bearing pads 3 are housed within an oil tub 4 charged with lubricating oil 5. With such an arrangement, the whole weight of rotating portions of, for example, a water turbine generator is slidably carried on said pads. For example, in case of a water turbine generator having an output of 100 MVA and rotating at 112.5 R.P.M., the friction loss is approximately 100 KW, while the agitation loss is approximately 100 KW. It is a recent trend for the water turbine generator to increase in mass and in R.P.M. from the view-point of economy, and this in turn incurs another problem of increase in bearing loss to an amazingly great extent, i.e., the water turbine generator having an output of 300 MVA and rotating at 500 r.p.m. presents the bearing loss of 6000 KW, 5000 KW of which agitation loss in responsible for. This is due to the fact that the friction loss is proportional to the 1.5th power the cube/square of a peripheral speed of the bearing runner, while the agitation loss is in proportion to the cube of a peripheral speed of the same. Accordingly, in case the lubricating oil charged within an oil tub is not maintained to a level above that of the sliding surface of the bearing runner which contacts the bearing pad, like the conventional thrust bearing device, the agitation loss can not be reduced, however in case the level of lubricating oil is lowered to a level be low the sliding surface thereof, the possibility of an unwanted agitation of lubricating oil caused by the bearing runner is eliminated, and hence no agitation loss is incurred to the bearing loss.

The description will be given with reference to one embodiment shown FIGS. 2 and 3. Designated at 1 is a rotational shaft, to which a rotor of a water turbine generator is rigidly fixed, said rotational shaft being further connected to a runner of a water turbine at its lower end. Denoted at 3 are a plurality of bearing pads, which slidably support an annular sliding surface of said bearing runner 2 thereon and have sector shapes in its horizontal cross section. Designated at 4 is an oil tub, in which lubricating oil 5 is stored after said oil has completed lubrication for the supporting portion of said bearing pad 3, and then bearing runner 2 and bearing pad 3. Designated at 6A and 6B are plates provided around a radially inner and outer sides of the bearing pad 3, and at 7 is another plate provided, in continuity with said plates 6A and 6B, on the side of the bearing pad which faces the rotational direction of the bearing runner 2. These plates 6A, 6B and 7 are attached so as to extend to the underside of the bearing pad 3, to thereby form an oil overflowing chamber 8 open to the surface of bearing runner 2 in sliding contact with a surface S of bearing pad 3. Denoted at 9 is an oil feeding pipe, through which cooled lubricating oil is fed into said oil overflowing chamber 8, and at 10 is an oil return pipe for causing oil 5 to return into the oil tub 4. An oil pump 11 and an oil cooler 12 are connected between said return pipe 10 and said oil feeding pipe 9, thereby constituting an oil feeding unit.

With such arrangements, in operation of the water turbine generator, the cooled lubricating oil is continuously fed through the oil feeding pipe 9 into the oil overflowing chamber 8, for causing overflowing of the oil therefrom. Thus, as soon as the bearing runner 2 starts to rotate, the thus overflowing lubricating oil is introduced to the surface of bearing pad 3 sliding relative to the bearing runner 2, thereby lubricating the bearing runner 2 and the bearing pad 3 as well as cooling said runner and pad. An amount of oil which is to be fed to the oil overflowing chamber 8 should be such that an oil film be maintained in the interface of the bearing runner 2 and the bearing pad 3. The feeding of an excessive oil of an amount more than required brings about no appreciable effect.

As is apparent from the foregoing, the lubrication and the cooling of the bearing runner 2 and the bearing pad 3 are effected by means of the oil overflowing chamber 8 provided along the sides of the bearing pad 3, such that the level of oil L charged in the oil tub 4 may be lowered down to a mid portion of the bearing pad 3. Accordingly, the oil-contacting surface of bearing runner may be limited to the sliding surface thereof, with the other surfaces thereof being maintained out of contact with the lubricating oil. This serves to achieve the reduced agitation loss of the lubricating oil to a great extent.

Figure 2:
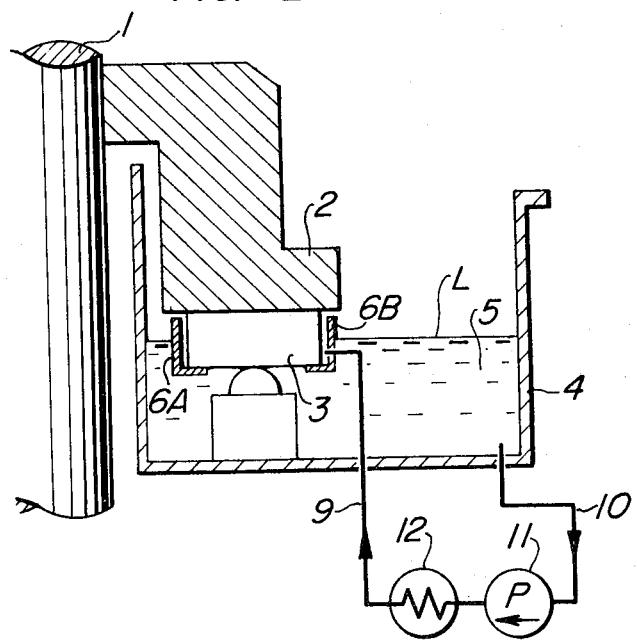
Figure 3:
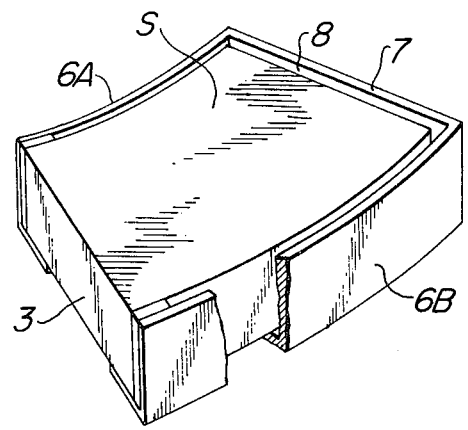
FIGS. 3 through 6 are perspective views exemplifying various types of bearing pads used in the thrust bearing device according to the present invention, respectively.
Figure 4:
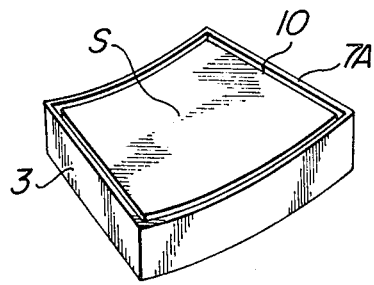

The thrust bearing device as shown in FIGS. 2 and 3 is used for a unidirectionally rotating rotary machine. With a thrust bearing device for use with a bidirectionally rotating rotary machine, a plate 7A is provided in the bearing pad 8 around the entire periphery or sides thereof, so as to define an oil overflowing chamber 10 open to the relatively sliding surface S of bearing pad 3, whereby the lubricating oil may be fed to the sliding surface S of bearing pad 3, irrespective of the direction of rotation of the rotary machine.

Figure 5:
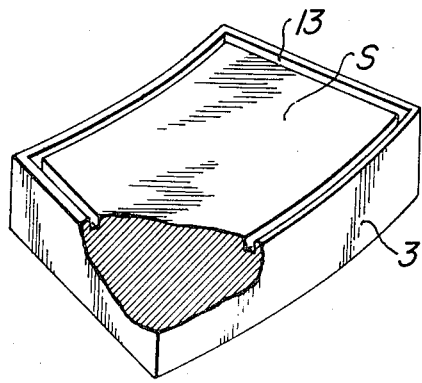
Figure 6:
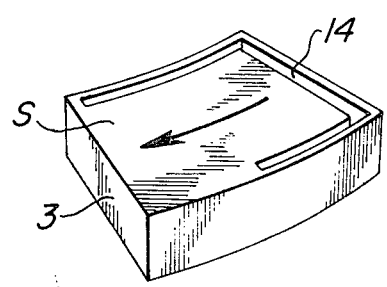

In the embodiments as set forth, the oil overflowing chambers 8 and 10 are formed by providing around the outer periphery of the bearing pad 3 the plates 6A, 6B, 7 and 7A, respectively. The oil overflowing chamber, in place of the plates 6A, 6B, 7 and 7A, may be a groove 13 or 14 formed circumferentially of the sliding surface S of bearing pad 3, as shown in FIG. 5 or 6. The bearing pad as shown in FIG. 5 is used in a bidirectionally rotating rotary machine, in which the inner peripheral groove 13 is formed in a manner to encircle the sliding surface of bearing pad 3 along and inwardly of the periphery thereof. The bearing pad 3 as shown in FIG. 6 is used in a rotary machine which rotates unidirectionally only in the direction of an arrow. In said bearing pad 3, the groove 14 is provided to cover the radially inner and outer sides and the side facing the direction of rotation of the bearing pad.

Figure 7:
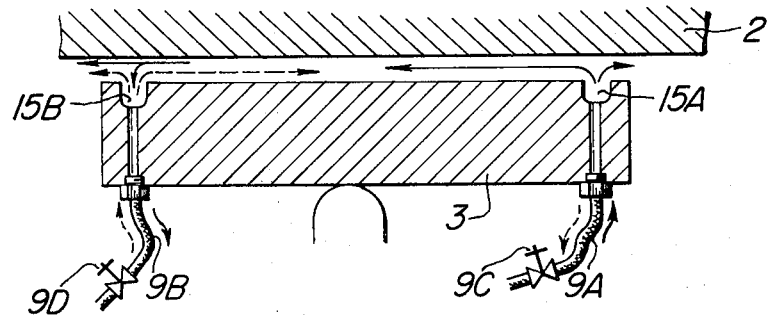
FIG. 7 is a longitudinal cross-sectional view illustrating the bearing pad used in a thrust bearing device according to the present invention.

In case the oil overflowing chamber is formed in an endless fashion or in a fashion suited for the bidirectional rotation of the machine along the circumference of the sliding surface S of bearing pad 3, two grooves 15A and 15B are formed at a right angle to the direction of rotation (on the left and right sides in FIG. 7) of the bearing runner 2, as best seen in FIG. 7. When lubricating oil is continuously fed to these grooves 15A and 15B by way of oil feeding pipes 9A and 9B, respectively, and in case the bearing runner 2 is caused to rotate from the right to the left as viewed in FIG. 7, then the lubricating oil which has fed in the groove 15B located at the leftmost position of bearing pad 3 runs counter to the direction of rotation of the bearing runner, to overflow from the groove 15B into the oil tub, without being introduced to the contacting surface between the bearing runner 2 and bearing pad 3. For this reason, valve means 9C, 9D are provided in oil feeding pipes 9A and 9B, respectively, whereby the lubricating oil, in case of the bearing runner 2 being rotated from the right to the left, is allowed to be fed only into the groove 15A to the right side of the bearing pad 3, thereby permitting the flow of the lubricating oil in the direction of an arrow shown by a solid line. In detail, the lubricating oil which comes out from the groove partly flows counter to the direction of rotation of the bearing runner 2 to be received within the oil tub, with the other major parts of lubricating oil being introduced between said bearing runner 2 and bearing pad 3 during the rotation of the bearing runner, thereby forming a oil film thereat for the accompanied cooling of the bearing runner and bearing pad. In case the bearing runner 2 is caused to rotate from the left to the right in the drawing, the lubricating oil is fed only to the groove 15B to the left side of the bearing pad 3, whereby the lubricating oil flows in the directions of arrow shown by a dotted line, thereby presenting an effect the same as in the case of the right-to-left rotation of the bearing runner.

If such an arrangement is provided that a negative pressure, during the overflowing of lubricating oil from the groove 15A, is exerted to act on the groove 15B opposite the groove 15A for the suction of the lubricating oil which has been introduced between the bearing runner 2 and the bearing pad 3, then the cooled lubricating oil alone is supplied, without causing the introduction of the hot oil film to the adjacent bearing pad portion, such that the cooling effect throughout the thrust bearing device is enhanced.

Figure 8:
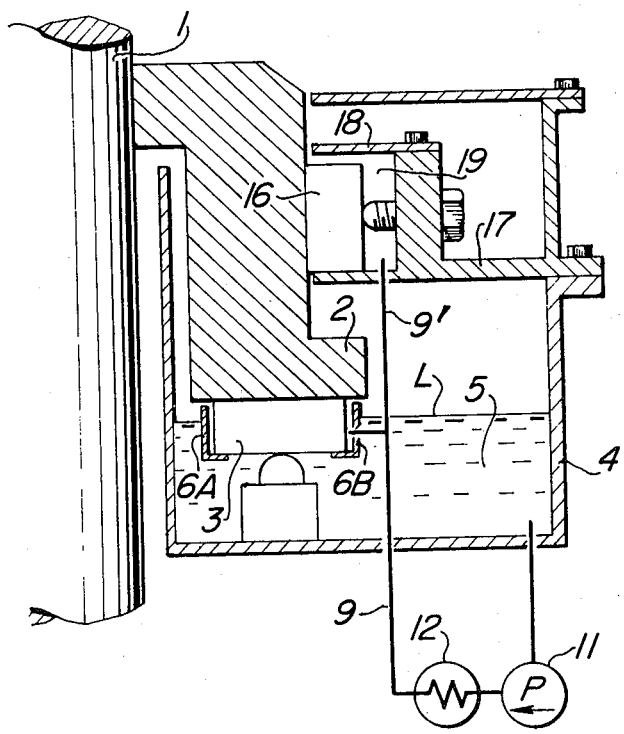
FIG. 8 is a longitudinal cross-sectional view showing a thrust bearing device equipped with a guide bearing, according to the present invention; and, FIG. 9 is a plot showing a relationship between R.P.M. and bearing loss.

Besides the thrust bearing device as set forth in the foregoing, a certain type of thrust bearing device may be equipped with a guide bearing. For such a thrust bearing device, as shown in FIG. 8, a branch pipe 9' stemed from the oil feeding pipe 9 is connected to an oil overflowing chamber 19 which is composed of a bearing support arm 17, on which a guide bearing pad is carried and a plate 18, whereby the lubricating oil may be fed into said chamber for causing the overflow of the oil therefrom, whereas the guide bearing pad 3 need not be submerged for the lubrication purpose in the lubricating oil 5 charged in the oil tub 4, and hence there arises little loss of the lubricating oil due to the agitation of oil caused by the bearing runner 2. In FIG. 8, no explanation is given to portions similar to those shown in FIG. 2 and hence the same reference numerals are used in common.

Figure 9:
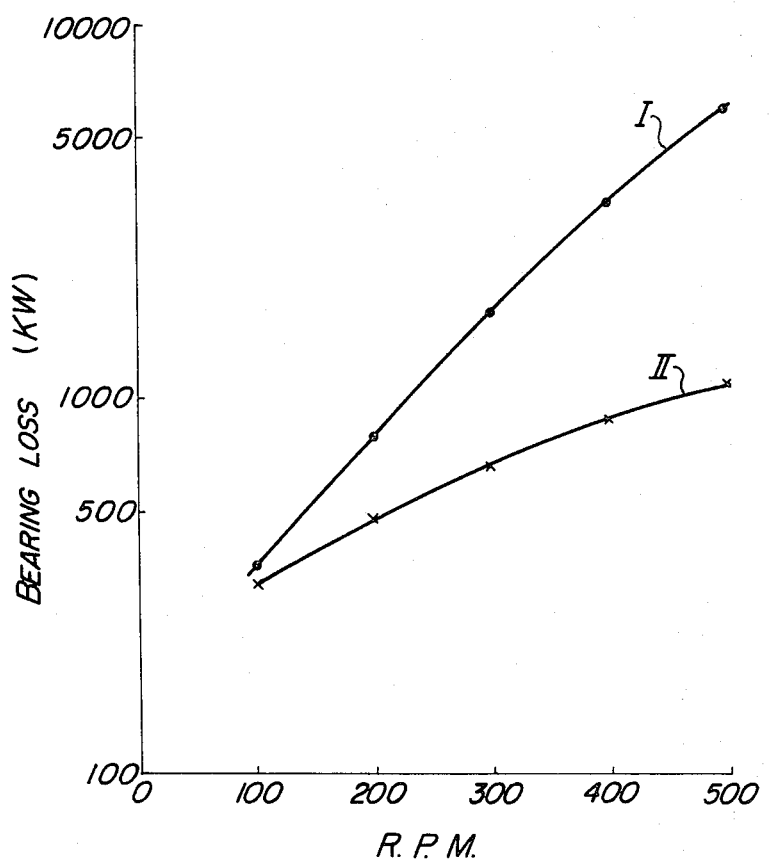

Referring now to FIG. 9 which illustrates how the bearing loss of a generator varies with the change in R.P.M., said generator havng a bearing runner of 3100 mm in an outer diameter and an output of 300 MVA. In FIG. 9, the curve I represents the bearing loss in the conventional thrust bearing device equipped with a guide bearing, in which the guide bearing pad is submerged in the lubricating oil. The curve II represents the bearing loss in the thrust bearing device of the present invention which has the construction as shown in FIG. 8.

As is obvious from the plot, with the construction that the level of the lubricating oil is lowered to the level of the relative sliding surface of the bearing pad, the loss presents the reduction of approximately 5000 R.P.M., and this teaches that such a construction is useful particularly for a high speed rotary machine.

According to the present invention, an oil overflowing chamber is provided circumferentially of the relative sliding surface of bearing pad so as to effect the lubrication and the cooling for the bearing runner and bearing pad by causing the lubricating oil to overflow from said oil overflowing chamber, such that a level of the lubricating oil charged in the oil tub which houses the bearing runner and bearing pads may be lowered down to a level below the sliding surfaces of bearing runner and bearing pad. Coupled with little agitation loss which has been heretofore experienced with the rotation of the bearing runner dipped in the lubricating oil, there is attained the reduction in the bearing loss to a greater extent in the thrust bearing device. The lowered level of lubricating oil permits the reduction in size of the oil tub, and in addition, an amount of lubricating oil to be fed is greatly reduced to such an extent only sufficient for presenting an oil film between the bearing runner and bearing pad, which is advantageous from the viewpoint of economy of oil.

What is claimed is:

1. A thrust bearing device for use in a vertical shaft rotary machine comprising
    a bearing runner rigid with a rotational vertical shaft;
    a plurality of bearing pads each having a sector shape in its horizontal cross-section and slidably supporting said bearing runner thereon;
    at least one oil overflowing chamber provided for said pads along the radially inner and outer sides of said pads and the side thereof facing the direction of rotation of said bearing runner, said chamber being open to the relative sliding surface of said pads, and
    means for feeding a sufficient amount of oil into said at least one oil overflowing chamber to provide an oil film for the relative sliding surface of said bearing pads for lubrication and for maintaining the level of oil overflowed from said oil overflowing chamber lower than the lower faces of said bearing runners.

2. A thrust bearing device for use in a vertical shaft rotary machine as defined in claim 1, wherein said means includes oil pump means, oil cooling means and oil conduit means for communication of the oil in said overflowing chambers through said oil pump means and said oil cooling means.

3. A thrust bearing device for use in a vertical shaft rotary machine as defined in claim 2, in which said oil overflowing chamber is formed in an endless fashion having two portions at a right angle to the direction of rotation of said bearing runner, said two portions are provided with oil feeding pipes respectively each of which communicates said oil conduit means, and said oil feed pipes are provided valve means respectively for lubricating oil allowed to be fed only into one portion of said oil overflowing chamber to the direction of rotation of said bearing runner.

4. A thrust bearing device for use in a vertical shaft rotary machine as defined in claim 2, wherein a plurality of overflowing chambers is provided and each defined by the side portions of said bearing pad and a plate which is disposed with a distance spaced from said side portion of said bearing pad and the lower end portion of which extend under said bearing pad.

5. A thrust bearing device for use in a vertical shaft rotary machine as defined in claim 1, wherein said oil overflowing chamber is composed of a bearing support arm, on which a guide bearing pad is carried and a plate, and said chamber is connected with said means for causing the overflow of oil therefrom.

* * * * *